United States Patent
Abitbol et al.

(10) Patent No.: US 11,943,357 B2
(45) Date of Patent: Mar. 26, 2024

(54) MITIGATING RISK IN BUSINESS NETWORKS IN A PRIVACY PRESERVING MANNER

(71) Applicant: International Business Machines Corporation, Armonk, NY (US)

(72) Inventors: Roy Abitbol, Zurit (IL); Jonathan Bnayahu, Haifa (IL); Eliezer Segev Wasserkrug, Haifa (IL); Pankaj Satyanarayan Dayama, Bangalore (IN); Artem Barger, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 17/121,380

(22) Filed: Dec. 14, 2020

(65) Prior Publication Data

US 2022/0191030 A1 Jun. 16, 2022

(51) Int. Cl.
*H04L 9/32* (2006.01)
*G06Q 10/0635* (2023.01)
*G06Q 10/0637* (2023.01)

(52) U.S. Cl.
CPC ....... *H04L 9/3218* (2013.01); *G06Q 10/0635* (2013.01); *G06Q 10/06375* (2013.01)

(58) Field of Classification Search
CPC .............. H04L 9/3218; G06Q 10/0635; G06Q 10/06375

See application file for complete search history.

(56) References Cited

U.S. PATENT DOCUMENTS

| 10,296,857 | B2 | 5/2019 | Martin |
| 2014/0019471 | A1 | 1/2014 | Linton |
| 2014/0278728 | A1 | 9/2014 | Hollenbach |
| 2016/0099931 | A1* | 4/2016 | Nethi ................. H04L 63/0815 726/8 |
| 2017/0193411 | A1 | 7/2017 | Vashistha |
| 2019/0188616 | A1 | 6/2019 | Urban |
| 2021/0216656 | A1* | 7/2021 | Xuan ..................... G06F 21/44 |

FOREIGN PATENT DOCUMENTS

CN 105636069 A * 1/2016

* cited by examiner

*Primary Examiner* — Ayoub Alata
(74) *Attorney, Agent, or Firm* — Aaron Pontikos

(57) ABSTRACT

Aspects of the present invention disclose a method for calculating a risk resulting from a network of networks that includes unknown relationships in a privacy preserving manner. The method includes one or more processors determining a set of conditions corresponding to a user of a network. The method further includes transmitting a compliance request corresponding to the set of conditions to one or more members of the network utilizing a privacy preserving algorithm. The method further includes determining a respective risk factor of one or more members of the network, wherein the respective risk factor corresponds to a response of each of the one or more members to the compliance request. The method further includes determining an overall risk of the network based at least in part on the risk factors of the one or more members.

17 Claims, 5 Drawing Sheets

MITIGATING RISK IN BUSINESS NETWORKS IN A PRIVACY PRESERVING MANNER

BACKGROUND OF THE INVENTION

The present invention relates generally to the field of business networks, and more particularly to preserving privacy in risk mitigation.

In recent years, an exponential growth in volume and variety of data has occurred due to diverse applications of computers in all domain areas. Privacy is the ability of an individual to determine what data can be shared and employ access control. If the data is in a public domain, then the data poses a threat to individual privacy as the data is held by a data holder. Data holders can be social networking application, websites, mobile apps, ecommerce site, banks, hospitals, etc. Data holders have the responsibility to ensure privacy of data of the users.

Cryptography is the practice and study of techniques for secure communication in the presence of third parties called adversaries. More generally, cryptography is about constructing and analyzing protocols that prevent third parties or the public from reading private messages. Additionally, various aspects in information security such as data confidentiality, data integrity, authentication, and non-repudiation are central to modern cryptography.

Secure multi-party computation (e.g., secure computation, multi-party computation (MPC), or privacy-preserving computation) is a subfield of cryptography with the goal of creating methods for parties to jointly compute a function over inputs of the parties while keeping the inputs private. Unlike traditional cryptographic tasks, where cryptography assures security and integrity of communication or storage and the adversary is outside the system of participants, the cryptography in this model protects participants' privacy from each other. Additionally, a zero-knowledge proof or zero-knowledge protocol is a method by which one party (e.g., the prover) can prove to another party (e.g., the verifier) that the prover knows a value 'x', without conveying any information apart from the fact that they know the value 'x'.

SUMMARY

Aspects of the present invention disclose a method, computer program product, and system for calculating a risk resulting from a network of networks that includes unknown relationships in a privacy preserving manner. The method includes one or more processors determining a set of conditions corresponding to a user of a network. The method further includes one or more processors transmitting a compliance request corresponding to the set of conditions to one or more members of the network utilizing a privacy preserving algorithm. The method further includes one or more processors determining a respective risk factor of one or more members of the network, wherein the respective risk factor corresponds to a response of each of the one or more members to the compliance request. The method further includes one or more processors determining an overall risk of the network based at least in part on the risk factors of the one or more members.

DETAILED DESCRIPTION

Figure 1:
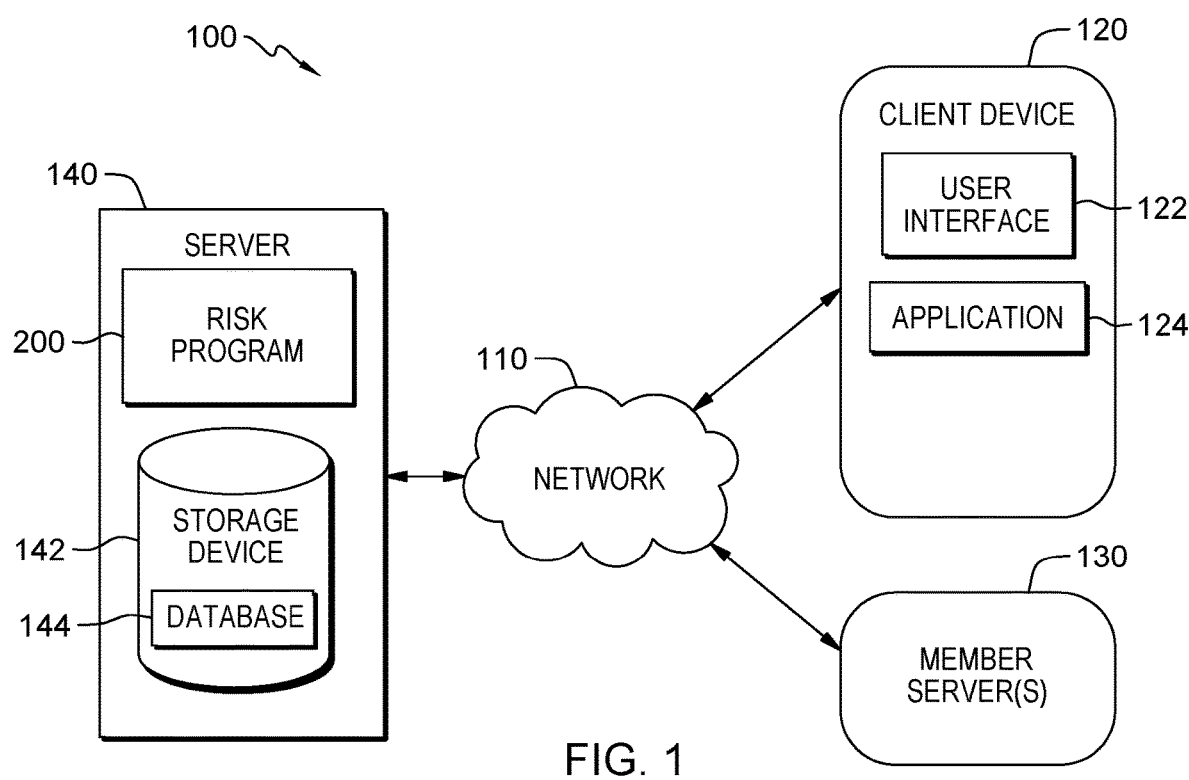
FIG. 1 is a functional block diagram of a data processing environment, in accordance with an embodiment of the present invention.

Embodiments of the present invention allow for calculating a risk resulting from a network of networks that includes unknown relationships in a privacy preserving and/or federated manner, which does not require any party to divulge/share sensitive information. Embodiments of the present invention calculate risk from a business network while preserving privacy of parties of the business network. Additional embodiments of the present invention apply privacy protected computation techniques to network of networks in a cascading manner. Further embodiments of the present invention utilize a calculated risk of a business network to identify optimization scenarios for mitigating risk of a party (i.e., choosing a reduced risk upstream network).

Some embodiments of the present invention recognize participants in business networks seek to continuously meet demands of clients and participants are relying on network members to meet demand of the clients. Additionally, embodiments of the present invention recognize the challenge is to be able to calculate risk, and mitigate the risk, while taking into account such unknown relationships of network members while preventing exposure of sensitive information of the network members. For example, managing risk involved in supply and demand commitments is complicated due to the dependent nature of relationships between different network members that are not known to each individual participant. In one scenario, Client A should not be aware of the relationship between Member B and the other parties (e.g., unknown relationship). However, Client A's ability to calculate and mitigate this "secondary" risk due to the unknown relationship of Member B is crucial due to impact on Member A directly. Furthermore, similar principals apply to various other multi-entity Bayesian networks (MEBNs) such as manufacturing, financial networks including banks, customers, etc., or a healthcare network with patients and treatments. Various embodiments of the present invention remedy such challenges by calculating the risk resulting from an entire network of networks including unknown relationships while not requiring any participant to divulge sensitive information. As a result, a client can reduce the risk imposed from network members or at least have a better understanding of the risk imposed.

Embodiments of the present invention recognize that business networks experience data security issues (e.g., exposure of sensitive information) while transmitting messages to and from members of the business networks due to members attempting to gather additional information from the messages. Various embodiments of the present invention can operate to increase data security of business networks by utilizing privacy preserving algorithms to prevent members from divulging sensitive information.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Risk program 200 enables the authorized and secure processing of personal data. Risk program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Risk program 200 provides information regarding personal data and the nature (e.g., type, scope, purpose, duration, etc.) of the processing. Risk program 200 provides the user with copies of stored personal data. Risk program 200 allows the correction or completion of incorrect or incomplete personal data. Risk program 200 allows the immediate deletion of personal data.

Distributed data processing environment 100 includes server 140, client device 120, and member server(s) 130, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, member server(s) 130, and client device 120, and other computing devices (not shown) within distributed data processing environment 100. For example, network 110 can not only be a supply and/or logistics chain but also a computer network, a telecommunications network, transportation network, or power grid.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of risk program 200.

In various embodiments of the present invention, member server(s) 130 may be a desktop computer, a computer server, or any other computer systems, known in the art. In general, member server(s) 130 is representative of any electronic device or combination of electronic devices capable of executing computer readable program instructions. Member server(s) 130 may include components as depicted and described in further detail with respect to FIG. 4, in accordance with embodiments of the present invention.

Member server(s) 130 can be a standalone computing device, a management server, a web server, a mobile computing device, or any other electronic device or computing system capable of receiving, sending, and processing data. In one embodiment, member server(s) 130 can represent a server computing system utilizing multiple computers as a server system, such as in a cloud computing environment. In another embodiment, member server(s) 130 can be a laptop computer, a tablet computer, a netbook computer, a personal computer (PC), a desktop computer, a personal digital assistant (PDA), a smart phone, or any programmable electronic device capable of communicating with client device 120, server 140, and other computing devices (not shown) within distributed data processing environment 100 via network 110. In another embodiment, member server(s) 130 represents a computing system utilizing clustered computers and components (e.g., database server computers, application server computers, etc.) that act as a single pool of seamless resources when accessed within distributed data processing environment 100.

In another embodiment, member server(s) 130 represents one or more members of a supply chain network that provide information (e.g., goods, resources, services, inventory, etc.) to client device 120. In this embodiment, one or more member instances of member server(s) 130 can be a participant of a first network of client device 120, which is known to a user of client device 120. Additionally, the one or more instances of members server(s) 130 can be a participant of a second network of an instance of member server(s) 130 that participates in the first network of client device 120, which is unknown to the user of client device 120. Additionally, risk program 200 utilizes the one or more instances of members server(s) 130 to determine risk factors that are utilized to compute an overall risk of a network with respect to client device 120.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120, member server(s) 130, and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and risk program 200. Storage device 142 can be implemented with any type of storage device, for example, persistent storage 405, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes a risk values, mitigation actions, conditions, protocols, etc. In one embodiment, data processing environment 100 can include additional servers (not shown) that host additional information that accessible via network 110.

Generally, risk program 200 calculates a risk resulting from a network of networks that includes unknown relationships in a privacy preserving manner. Additionally, risk program 200 can convert insights from a risk calculation into actionable recommendations for risk mitigation. In one embodiment, risk program 200 identifies a set of conditions corresponding to a user of client device 120. Also, risk program 200 determines compliance of member server(s) 130 of network 110 with the set of conditions of the user of client device 120. Additionally, risk program 200 utilizes the compliance of member server(s) 130 to compute an overall risk value for network 110 with respect to member server(s) 130. Furthermore, risk program 200 utilizes the compliance of member server(s) 130 and the overall risk to perform mitigation/optimization actions for network 110 and member server(s) 130.

Figure 2:
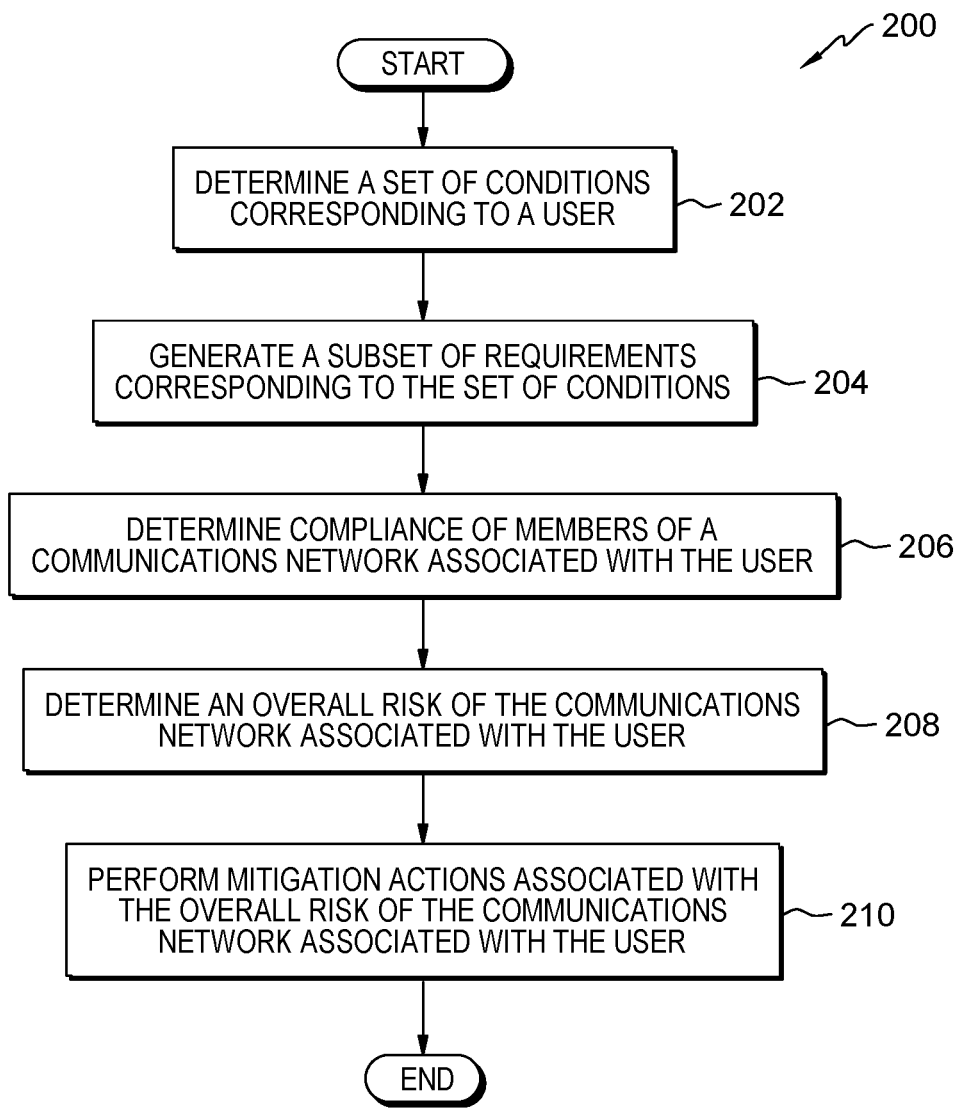
FIG. 2 is a flowchart depicting operational steps of a program, within the data processing environment of FIG. 1, for calculating a risk resulting from a network of networks that includes unknown relationships in a privacy preserving manner, in accordance with embodiments of the present invention.

FIG. 2 is a flowchart depicting operational steps of risk program 200, a program that calculates a risk resulting from a network of networks that includes unknown relationships in a privacy preserving manner, in accordance with embodiments of the present invention. In one embodiment, risk program 200 initiates in response to a user connecting client device 120 to risk program 200 through network 110. For example, risk program 200 initiates in response to a user registering (e.g., opting-in) a laptop (e.g., client device 120) with risk program 200 via a WLAN (e.g., network 110). In another embodiment, risk program 200 is a background application that continuously monitors client device 120. For example, risk program 200 is a client-side application (e.g., application 124) that initiates upon booting of a laptop (e.g., client device 120) of a user and monitors a business network for triggering events.

In step 202, risk program 200 determines a set of network conditions corresponding to a user. In one embodiment, risk program 200 determines a set of conditions corresponding to a user of client device 120. For example, risk program 200 determines a set of conditions 'C(t)' corresponding to a user of a computing device (e.g., client device 120) that one or more members (e.g., member server(s) 130) of a network of networks (e.g., network 110, member server(s) 130, business network, etc.) must fulfill at time 't'. In this example, risk program 200 can derive the set of conditions using external requirements (e.g., policies, regulations, and/or restrictions independent of constraints of a business network) and/or business network constraints (e.g., response times, deadlines, etc.).

Figure 3A:
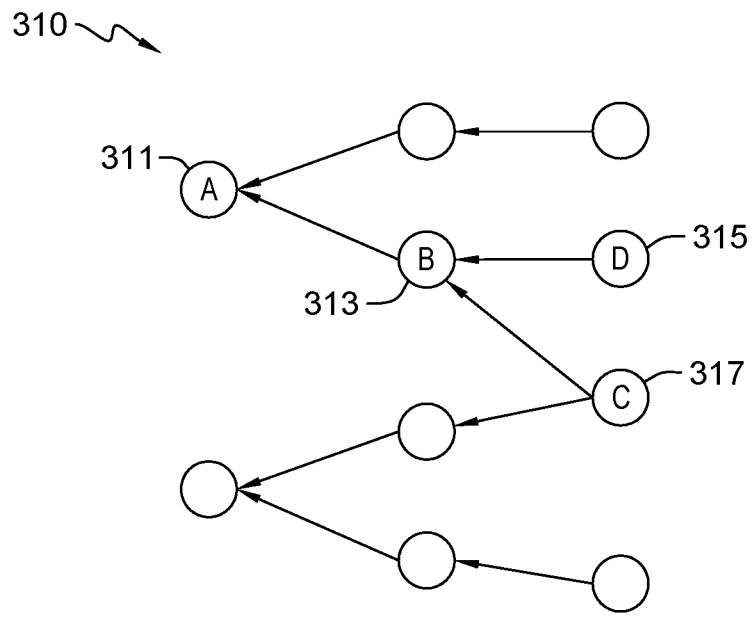
FIG. 3A is a diagram depicting an instance of a structure of relationships between members of a business network, in accordance with embodiments of the present invention.

FIG. 3A depicts business network 310, which is an example illustration of an instance of a structure (e.g., supply chain) of relationships between members of a network (e.g., FIG. 1), in accordance with example embodiments of the present invention. Business network 310 includes Party A 311, Party B 313, Party C 317, and Party D 315. Party A 311 is a root node of business network 310, which corresponds to client device 120 of FIG. 1. Party B 313, which corresponds to member server(s) 130 of FIG. 1, is a child node of Party A 311 of business network 310. Party D 315, which corresponds to member server(s) 130 of FIG. 1, is a child node of Party B 313 of business network 310.

Party C 317, which corresponds to member server(s) 130 of FIG. 1, is a child node of Party B 313 of business network 310 and is a child node of an additional network not visible to Party A 311.

In an example embodiment with respect to FIG. 3A, Party A 311 depends on Party B 313 for the supply of a component (e.g., assets, inventory, etc.). Party B 313 generates the component using materials (e.g., resources, etc.) from Party C 317, and Party A 311 is unaware of Party C 317. As a result, risk program 200 can determine constraints (e.g., set of conditions) from relationships of parties of business network 310. In this example embodiment, risk program 200 can determine response time (e.g., delivery timeframe) for Party B 313 based on a dependency relationship with Party A 311.

Figure 3B:
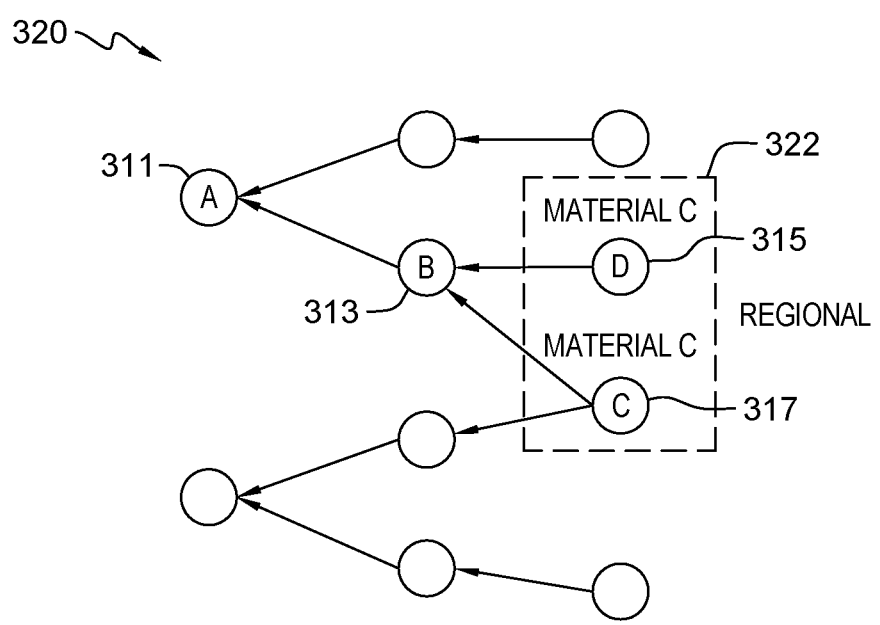
FIG. 3B is a diagram depicting an instance of a structure of relationships between members of a business network that includes an external requirement, in accordance with embodiments of the present invention.

FIG. 3B depicts business network 320, which is an example illustration of an instance of a structure (e.g., supply chain) of relationships between members of a network (e.g., FIG. 1) that includes an external requirement, in accordance with example embodiments of the present invention. Business network 320 includes Party A 311, Party B 313, Party C 317, Party D 315, and regional constraint 322. Party A 311 is a root node of business network 320, which corresponds to client device 120 of FIG. 1. Party B 313, which corresponds to member server(s) 130 of FIG. 1, is a child node of Party A 311 of business network 320. Party D 315, which corresponds to member server(s) 130 of FIG. 1, is a child node of Party B 313 of business network 310. Party C 317, which corresponds to member server(s) 130 of FIG. 1, is a child node of Party B 313 of business network 320 and is a child node of an additional network not visible to Party A 311. Regional constraint 322 is an external requirement that Party A 311 must comply with.

In an example embodiment with respect to FIG. 3B, Party A 311 depends on Party B 313 for a compound (e.g., assets, inventory, etc.) in the manufacture of a component. Party B 313 generates the compound of the component using Material C (e.g., resources, etc.) from Party C 317 and Party D 315, and Party A 311 is unaware of Party C 317. As a result, risk program 200 can determine constraints (e.g., set of conditions) from external requirements independent of business network 320. In this example embodiment, risk program 200 identifies a regional exposure constraint based on regional constraint 322 related to Material C that is manufactured in a certain region/country by Party C 317 and Party D 315, but the total exposure of Party A 311 to the certain region/country should not be more than 'x' % for Material C.

In step 204, risk program 200 generates a subset of requirements corresponding to the set of network conditions. In one embodiment, risk program 200 identifies one or more constraints corresponding to the set of conditions corresponding to a user of client device 120. For example, risk program 200 determines one or more core requirements '$C_i$' of a set of conditions '$C(t)$' corresponding to a user of a computing device (e.g., client device 120) that one or more members (e.g., member server(s) 130) of a network of networks (e.g., network 110, member server(s) 130, business network, etc.) must fulfill at time 't'. In one scenario, '$C(t)$' corresponds to resources of two or more servers (e.g., member server(s) 130) a computing device (e.g., client device 120) of a user must utilize to process a workload. In this example, risk program 200 identifies an amount and type of resources required to process the workload with respect to the two or more servers. In another scenario, risk program 200 determines that a user would needs to produce one thousand (1000) units of Material A (e.g., '$C(t)$'). Additionally, risk program 200 determines that one thousand (1000) units of Material A requires ten (10) kilograms of Compound A and ten (10) kilograms of Compound B (e.g., '$C_i$', '$C_1$', '$C_2$', etc.), and risk program 200 identifies one or more suppliers (e.g., member server(s) 130) of a supply chain (e.g., network 110) responsible for supplying Compound A and Compound B.

In step 206, risk program 200 determines compliance of members of a business network associated with the user. In various embodiments of the present invention, a user of client device 120 may need to know whether member server(s) 130 can fulfill a set of conditions the user requires. Additionally, member server(s) 130 would likely not want to expose a response to the user via network 110 due to exposure risk of sensitive information (e.g., business level info, inventory, etc.) when sharing a response. Furthermore, upstream parties of a business network are assumed to be semi-honest (i.e., the parties follow a protocol but can attempt to infer and/or gather additional information from the messages that are exchanged with other parties).

In one embodiment, risk program 200 publishes a request to member server(s) 130 via network 110. For example, risk program 200 can define each condition of a set of conditions of a user in a form that allows parties (e.g., member server(s) 130) to respond. In this example, risk program 200 transmits a defined request to each of the parties of a business network and collects responses to determine compliance with the set of conditions (i.e., identify risk factors).

Figure 3C:
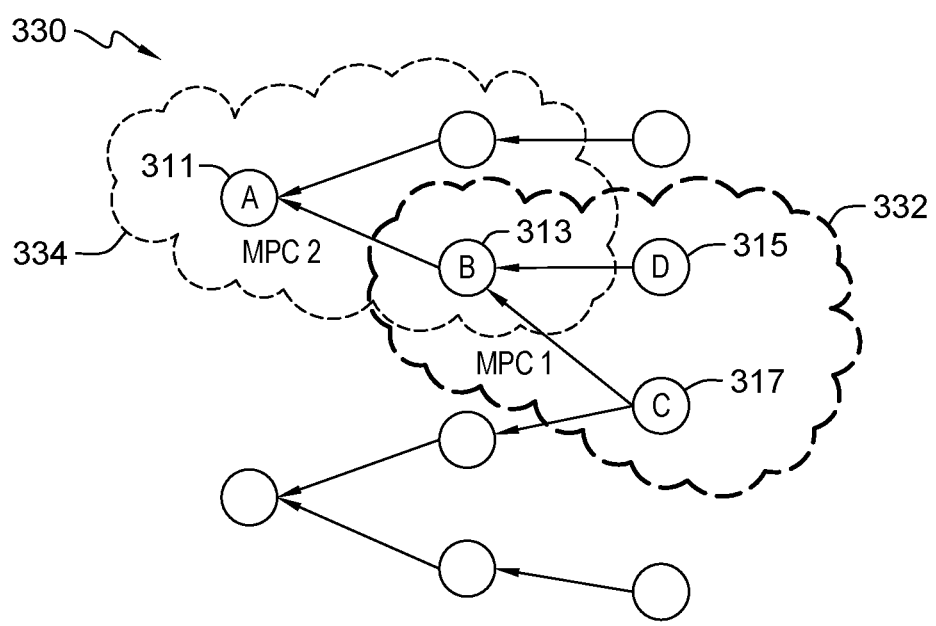
FIG. 3C is a diagram depicting an instance of a structure of relationships between members of a network that includes a plurality of privacy preserving protocols, in accordance with embodiments of the present invention.

FIG. 3C depicts business network 330, which is an example illustration of an instance of a structure (e.g., supply chain) of relationships between members of a network (e.g., FIG. 1) that includes a plurality of privacy preserving protocols, in accordance with example embodiments of the present invention. Business network 330 includes Party A 311, Party B 313, Party C 317, Party D 315, MPC1 332, and MPC2 334. Party A 311 is a root node of business network 330, which corresponds to client device 120 of FIG. 1. Party B 313, which corresponds to member server(s) 130 of FIG. 1, is a child node of Party A 311 of business network 320. Party D 315, which corresponds to member server(s) 130 of FIG. 1, is a child node of Party B 313 of business network 310. Party C 317, which corresponds to member server(s) 130 of FIG. 1, is a child node of Party B 313 of business network 330 and is a child node of an additional network not visible to Party A 311. MPC1 332 and MPC2 334 are protocols of methods for parties to jointly compute a function over respective inputs while keeping those inputs private from each other. In an example embodiment, risk program 200 can generate a relevant MPC protocol for each condition '$C_i$' of '$C(t)$', capable to compute risk assessment for underlying condition '$C_i$' between the upstream parties (e.g., Party B 313 and Party A 313, Party B 313 and Party D 315, etc.).

In another embodiment, risk program 200 determines whether member server(s) 130 complies with a set of conditions corresponding to a user of client device 120. For example, risk program 200 utilizes privacy preserving algorithms (e.g., multi-party computation (MPC), zero knowledge proof (ZKP), differential privacy, secret sharing, etc.) to allow parties of a business network to respond to a published request. In this example, risk program 200 identifies a response of parties (e.g., member server(s) 130) of a business network (e.g., network 110) allowing the parties to share responses without revealing any sensitive information beyond extracted risk values relevant to computation of risk as it relates to '$C(t)$'. In an alternative example, risk program 200 can enforce privacy preserving protocols of client device 120 and member server(s) 130 when sharing information.

In step 208, risk program 200 determines an overall risk of the business network associated with the user. In one embodiment, risk program 200 calculates a risk for a user of client device 120. For example, risk program 200 determines an overall risk based on fulfilled conditions of a set of conditions corresponding to a user. In this example, risk program 200 determines a risk factor for each relationship of a party (e.g., child node) of a business network (i.e., determines the risk of known parties/relation and no additional information is being divulged except for the risk value provided in the response to a published request). Additionally, risk program 200 aggregates the collected risk factors derived from the request corresponding to a subset of conditions to generate an overall risk for the business network.

In another embodiment, risk program 200 can calculate a risk for each relationship of client device 120 with member server(s) 130 via network 110. For example, risk program 200 can determine a risk factor corresponding to an isolated segment (e.g., relationship between parties) of a business network (i.e., risk can be defined by conditions '$C_i$'). Additionally, risk program 200 can cascade the risk factor collected across one or more networks. Referring now to FIG. 3A, in one scenario, Party C 317 is unknown to Party A 311.

Referring now to FIG. 3A, in one scenario, a risk of Party B 313 not meeting commitments to Party A 311 depends a great deal on Party C 317 being able to provide the material to Party B 313 (i.e., if risk program 200 determines a risk that C cannot meet commitment to B, then a risk exists that B will not be able to meet commitments to A). Additionally, Party A 311 requests to know that business network 310 (e.g., a supply chain network (SCN)) can hold a certain amount of inventory of material required to generate product (e.g., condition), thus risk program 200 calculates a risk respect to a risk value provided by Party B 313, which does not disclose inventory (e.g., sensitive information) of Party B 313 or Party C 317, and can utilize the risk value to determine a total network risk with respect to other child nodes of Party A 311 that provide the material.

Referring now to FIG. 3C, parties are assumed to comply to a central coordination and are semi-honest as the parties fulfill a common protocol and uphold a cascading risk policy. Risk program 200 enables generated MPCs corresponding to each underlying condition '$C_i$' of '$C(t)$' to protect risks shared by Party C 317 and Party D 315 by allowing the parties to "secretly-share" risk values within MPC1 332 without revealing any sensitive information to one another. Additionally, risk program 200 enables parties of MPC1 332 and MPC2 334 to calculate in isolation instances of underlying conditions '$C_i$' of '$C(t)$' and cascade computation through business network 330.

In an example embodiment, risk program 200 allows Party B 313 (e.g., a central trusted party) to compute risk for MPC1 332 (e.g., Party B 313's underlying network). In this example, risk program 200 allows Party B 313 to cascade risk of the underlying network to MPC2 334 due to participation in both network of business network 330 (i.e., for each party, based upon the overall risk calculation, provide the risk of every relation known by each party with each upstream party). As a result, risk program 200 prevents the ability of third parties to infer implicitly or explicitly any sensitive information about relationships between other participants.

In another embodiment, risk program 200 identifies an event that triggers computation of risk for a user of client device 120. For example, risk program 200 can trigger computation of risk of a business network (e.g., supply chain network SCN) upon identifying one or more events. In this example, risk program 200 can trigger calculation of risk of the business network upon determining a change occurred in a regulation (e.g., eternal requirement), onboarding of a new supplier (e.g., new participants), or an existing participant reports a changing in the business network (e.g., upstream chain change).

In step 210, risk program 200 performs mitigation actions associated with the overall risk of the business network associated with the user. In various embodiments of the present invention, risk program 200 can utilize risk calculations to run an optimization problem, which identifies options for new or different relationships to satisfy a set of conditions. As a result of utilizing the risk calculations, the options would be identified while still preserving privacy of sensitive information of participants. In one embodiment, risk program 200 determines a set of mitigation actions based on a set of conditions corresponding to a user of client device 120. For example, risk program 200 determines set of mitigation actions based on the set of conditions of a user. In this example, risk program 200 can identify different relationships within a business network with existing parties to satisfy each condition of the set of conditions based on a cost associated with a new relationship as well as costs associated with the risk materializing (e.g., as indicated by a response or the overall risk).

In another embodiment, risk program 200 performs a mitigation action. In one scenario, risk program 200 determines that a supplier (e.g., member server(s) 130) adds another upstream member to a business network of a computing device (e.g., client device 120) of a user and calculates a risk indicating that the supplier would not be able to satisfy a condition of a set of conditions of the computing device of the user. Then, risk program 200 can perform an optimization to determine whether adding a second supplier to the business network or utilize an existing participant (e.g., member server(s) 130) of the business network satisfies the condition. As a result, risk program 200 automatically adds the second supplier to the business network. Also, risk program 200 can utilize external requirements and/or business network constraints (as discussed in step 202) to identify suppliers, which can be an existing participant in the business network or new participant. In an alternative example, risk program 200 can perform mitigation actions to reduce costs of a business network, which improves (e.g., optimizes) performance of the business network. In this example, risk program 20 can generate recommendations to streamline a business network, such as eliminating relationships, adding relationships, eliminating duplicative data, visibility, etc.

Figure 4:
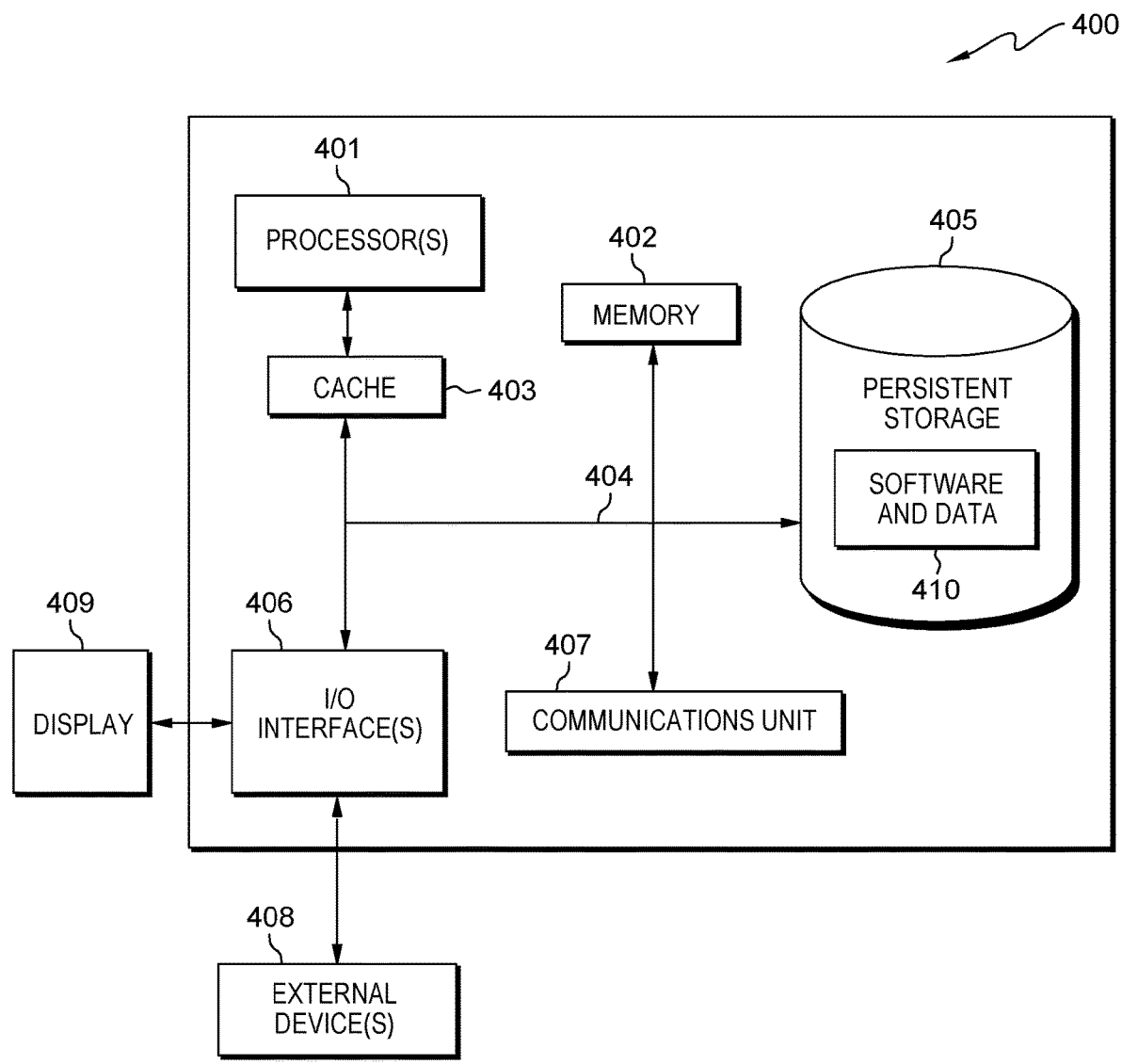
FIG. 4 is a block diagram of components of FIG. 1, in accordance with an embodiment of the present invention.

FIG. 4 depicts a block diagram of components of client device 120, member server(s) 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to server 140, software and data 410 includes data of storage device 142 and risk program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more processors, a set of network conditions of a network, wherein the network includes a root computing node, a plurality of primary child computing nodes connected to the root computing node, and a plurality of secondary child computing nodes connected to respective primary child computing nodes, wherein at least one secondary child computing node is unknown to the root computing node;
   transmitting, by one or more processors, a compliance request corresponding to the set of network conditions of the network to the plurality of primary and secondary child computing nodes;
   determining, by one or more processors, and using a first multi-party computation (MPC) protocol, respective first risk factors of the secondary child computing nodes derived from responses to the compliance request by the secondary child computing nodes; and
   determining, by one or more processors, and using a second MPC protocol, an overall risk of the network based, at least in part, on: (i) respective second risk factors of the primary child computing nodes derived from responses to the compliance request by the primary child computing nodes, and (ii) the respective first risk factors of the secondary child computing nodes determined using the first MPC protocol.

2. The method of claim 1, further comprising:
   performing, by one or more processors, a mitigation action corresponding to the overall risk of the network.

3. The method of claim 2, wherein performing the mitigation action corresponding to the overall risk of the network, further comprises:
   in response to determining that the respective risk factor of at least one of a primary or secondary child computing node indicates noncompliance with the compliance request, identifying, by one or more processors, one or more relationships of the network to satisfy a condition corresponding to the compliance request.

4. The method of claim 3, further comprising:
   identifying, by one or more processors, a cost associated with the identified one or more relationships, wherein an identified relationship includes adding a primary child computing node or a secondary child computing node to the network; and
   determining, by one or more processors, a risk factor corresponding to the identified relationship of the added primary or secondary child computing node.

5. The method of claim 1, further comprising:
   identifying, by one or more processors, a triggering event in the network, wherein the triggering event is selected from a group consisting of: regulation change of the network, onboarding a new primary or secondary child computing node, and a primary or second child computing node reporting a change in the network.

6. The method of claim 1, wherein determining the respective first and second risk factors of the primary and secondary child computing nodes further comprises:
extracting, by one or more processors, respective risk values from the responses to the compliance request by the primary and second child computing nodes.

7. A computer program product comprising:
one or more computer readable storage media and program instructions stored on the one or more computer readable storage media, the program instructions comprising:
program instructions to determine a set of network conditions of a network, wherein the network includes a root computing node, a plurality of primary child computing nodes connected to the root computing node, and a plurality of secondary child computing nodes connected to respective primary child computing nodes, wherein at least one secondary child computing node is unknown to the root computing node;
program instructions to transmit a compliance request corresponding to the set of network conditions of the network to the plurality of primary and secondary child computing nodes;
program instructions to determine, and using a first multiparty computation (MPC) protocol, respective first risk factors of the secondary child computing nodes derived from responses to the compliance request by the secondary child computing nodes; and
program instructions to determine, and using a second MPC protocol, an overall risk of the network based, at least in part, on: (i) respective second risk factors of the primary child computing nodes derived from responses to the compliance request by the primary child computing nodes, and (ii) the respective first risk factors of the secondary child computing nodes determined using the first MPC protocol.

8. The computer program product of claim 7, further comprising program instructions, stored on the one or more computer readable storage media, to:
perform a mitigation action corresponding to the overall risk of the network.

9. The computer program product of claim 8, wherein the program instructions to perform the mitigation action corresponding to the overall risk of the network, further comprise program instructions to:
in response to determining that the respective risk factor of at least one of a primary or secondary child computing node indicates noncompliance with the compliance request, identify one or more relationships of the network to satisfy a condition corresponding to the compliance request.

10. The computer program product of claim 9, further comprising program instructions, stored on the one or more computer readable storage media, to:
identify a cost associated with the identified one or more relationships, wherein an identified relationship includes adding a primary child computing node or a secondary child computing node to the network; and
determine a risk factor corresponding to the identified relationship of the added primary or secondary child computing node.

11. The computer program product of claim 7, further comprising program instructions, stored on the one or more computer readable storage media, to:
identify a triggering event in the network, wherein the triggering event is selected from a group consisting of: regulation change of the network, onboarding a new primary or secondary child computing node, and a primary or second child computing node reporting a change in the network.

12. The computer program product of claim 7, wherein the program instructions to determine the respective first and second risk factors of the primary and secondary child computing nodes further comprise program instructions to:
extract respective risk values from the responses to the compliance request by the primary and second child computing nodes.

13. A computer system comprising:
one or more computer processors;
one or more computer readable storage media; and
program instructions stored on the computer readable storage media for execution by at least one of the one or more processors, the program instructions comprising:
program instructions to determine a set of network conditions a network, wherein the network includes a root computing node, a plurality of primary child computing nodes connected to the root computing node, and a plurality of secondary child computing nodes connected to respective primary child computing nodes, wherein at least one secondary child computing node is unknown to the root computing node;
program instructions to transmit a compliance request corresponding to the set of network conditions of the network to the plurality of primary and secondary child computing nodes;
program instructions to determine, and using a first multiparty computation (MPC) protocol, respective first risk factors of the secondary child computing nodes derived from responses to the compliance request by the secondary child computing nodes; and
program instructions to determine, and using a second MPC protocol, an overall risk of the network based, at least in part, on: (i) respective second risk factors of the primary child computing nodes derived from responses to the compliance request by the primary child computing nodes, and (ii) the respective first risk factors of the secondary child computing nodes determined using the first MPC protocol.

14. The computer system of claim 13, further comprising program instructions, stored on the one or more computer readable storage media for execution by at least one of the one or more processors, to:
perform a mitigation action corresponding to the overall risk of the network.

15. The computer system of claim 14, wherein program the instructions to perform the mitigation action corresponding to the overall risk of the network, further comprise program instructions to:
in response to determining that the respective risk factor of at least one of a primary or secondary child computing node indicates noncompliance with the compliance request, identify one or more relationships of the network to satisfy a condition corresponding to the compliance request.

16. The computer system of claim 15, further comprising program instructions, stored on the one or more computer readable storage media for execution by at least one of the one or more processors, to:
- identify a cost associated with the identified one or more relationships, wherein an identified relationship includes adding a primary child computing node or a secondary child computing node to the network; and
- determine a risk factor corresponding to the identified relationship of the added primary or secondary child computing node.

17. The computer system of claim 13, wherein the program instructions to determine the respective first and second risk factors of the primary and secondary child computing nodes further comprise program instructions to:
- extract respective risk values from the responses to the compliance request by the primary and second child computing nodes.

* * * * *